United States Patent Office 3,520,957
Patented July 21, 1970

3,520,957
O-(4-NITROPHENYL)-O-ALKYL-N-ALKYLAMIDOPHOSPHATES
Karl Lutz, Basel, Switzerland, assignor to Sandoz Ltd., Basel, Switzerland, a corporation of Switzerland
No Drawing. Filed Nov. 17, 1966, Ser. No. 595,016
Claims priority, application Switzerland, Nov. 23, 1965, 16,099/65
Int. Cl. C07f 9/08; A01n 9/36
U.S. Cl. 260—954          1 Claim

ABSTRACT OF THE DISCLOSURE

The invention discloses O-(p-nitrophenyl)-O-alkyl-N-alkylamidophosphates useful for combatting pests.

---

The present invention relates to new phosphoric acid derivatives, a process for their production and their use for combatting pests.

One of the most important derivatives of phosphoric acid at present used as an insecticide is known under the name parathion and has the formula

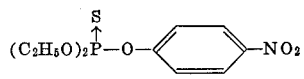

Its O-analog, known under the name paraoxon and having the formula

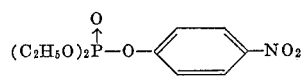

cannot be used as an insecticide because of its excessive toxicity to warm-blooded beings. The difference in the structure of parathion and paraoxon is that the former contains a sulphur atom instead of an oxygen atom, both atoms being linked to the phosphorus atom with a semi-polar bond, and this leads to an unacceptably high toxicity to warm-blooded animals in the case of paraoxon.

It has now been found that compounds of the Formula I

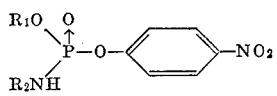

wherein $R_1$ represents alkyl radicals of from 1 to 3 carbon atoms inclusive, despite the fact that they contain an oxygen atom attached to the phosphorus atom by a semi-polar bond in manner similar to paraoxon, have a relatively low toxicity to warm-blooded animals which is less than that of parathion, but nevertheless show an excellent insecticidal or pesticidal effect which in some cases is superior to that of parathion.

The present invention therefore provides phosphoric acid derivatives of the Formula I

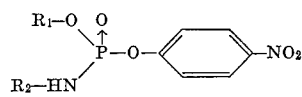

wherein each of $R_1$ and $R_2$ signifies an alkyl radical with from 1 to 3 carbon atoms inclusive, with the proviso that $R_1$ and $R_2$ may be radicals of the same definition.

The present invention also provides a process for the production of the compounds of Formula I, which is characterized in that 1 mol of a compound of the Formula II

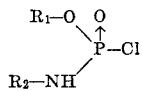

(II)

wherein $R_1$ and $R_2$ have the meaning stated above, is reacted with 1 mol of a 4-nitrophenolate of the formula

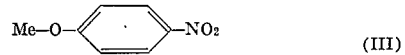

(III)

wherein Me represents a salt forming atom or a salt forming radical.

Reaction of the compound of Formula II with a 4-nitrophenolate of Formula III is advantageously effected in the presence of an inert solvent or suspension medium at a temperature of from −10° C. up to the boiling point of the solvent or suspension medium, for example at 0° to 100° C., preferably at room temperature.

Examples of inert solvent or suspension media (inert means that the media do not react with any of the reactants under the reaction conditions) are low molecular weight ketones, esters and ethers (the preferred solvents), for instance diethyl ether, di-n-propyl ether, di-isopropyl ether, furan, tetrahydrofuran, dioxan, ethyleneglycol-dimethyl ether and -diethyl ether, anisol etc.; other suitable inert solvents or suspension media are hydrocarbons which may be halogenated, for instance n-pentane, n-hexane, n-heptane, petroleum ether, benzene, toluene, cyclohexane, ethylene chloride, chloroform, carbon tetrachloride, bromoethane, dichloroethane, trichloroethylene, chlorobenzene, etc.

Preferred substituents Me in Formula III are alkali metal atoms, for instance a lithium, sodium or potassium atom, or onium radicals, for instance ammonium, trimethylammonium or triethylammonium radicals.

Instead of producing the 4-nitrophenolate of Formula III before the condensation, it is likewise possible to produce it in the reaction mixture itself from 4-nitrophenol and a tertiary amine, e.g. trimethylamine or triethylamine.

The compound of the Formula II used as starting material may be produced, for example, by reacting a compound of the Formula IV

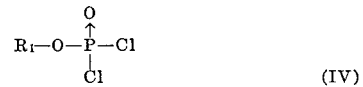

(IV)

with an amine of the formula $R_2$—$NH_2$ in the presence of an acid acceptor, $R_1$ and $R_2$ in these two last mentioned formulae having the significance stated above. Examples of suitable acid acceptors are tertiary amines, e.g. trimethylamine, triethylamine, pyridine, N,N-dimethyl- or N,N-diethylaniline, a second mol of the amine $R_2$—$NH_2$ or, alternatively, anhydrous inorganic acid binding agents, for instance sodium or potassium carbonate.

The reaction of the compound IV with $R_2$—$NH_2$ may be effected by bringing them together in the presence of an acid acceptor at a suitable temperature, it being advantageous to use an inert solvent of the above defined nature. Suitable working is effected at temperatures below room temperature, for example at −30° C. up to about +15° C., preferably at −10° to +10° C.

For the reaction of the compound II with the 4-nitrophenolate of the Formula III this, insofar as it is produced by the process given above by way of example, need not be isolated. In this way it is possible to start with a reaction mixture which is obtained by reacting 1 mol of a compound of the Formula IV and 1 mol of an amine of the formula $R_2$—$NH_2$ in the presence of an acid acceptor.

The phosphoric acid derivatives of the Formula I may be isolated from their solutions or suspensions in known manner; however, it is to be noted that the cation Me is bonded on chlorine after the reaction has taken place, and that the resulting chlorides, for example NaCl, KCl, $NH_4Cl$, $(CH_3)_3N·HCl$, are insoluble in many solvents and must therefore be separated off, for example by filtering or extracting with water, if necessary after dissolving the phosphoric acid derivatives of the Formula I by warming or adding a suitable solvent. Only then is it possible to isolate the end product, for example by evaporating the solvent or by precipitation with a suitable agent.

The phosphoric acid derivatives of Formula I are soluble in oils and organic solvents and are easily converted to aqueous emulsions. They are very suitable for combatting pests (especially insects) in plant protection.

Combatting of pests with the phosphoric acid derivatives of Formula I is suitably effected in such a way that they are mixed with emulsifiers, for example with liquid polyglycol ethers resulting by the addition of ethylene oxide to high molecular weight alcohols, mercaptans or alkylphenols, they are then emulsified in water and the emulsion is then applied to the surface to be treated by spraying.

It is further possible to add to the mixture suitable organic solvents, e.g. mono- or polyalcohols, ketones, aromatic hydrocarbons, mineral oils, etc. as solubilizers. However, in order to produce products capable of being suspended in water, it is also possible to incorporate solid carriers, e.g. talc, kaolin, diatomaceous earth, bentonite, etc. The liquid or pulverulent preparations containing a compound of Formula I are emulsified or dispersed in water before use, it being suitable for the resulting emulsions to contain 0.005–0.2% of the phosphoric acid derivative of Formula I.

However, the phosphoric acid derivatives of Formula I may be converted to dusting or strewing agents without the addition of emulsifiers, but if desired with the addition of adhesives, by mixing with an inert carrier, e.g. talc, kaolin, diatomaceous earth, bentonite, etc. or a mixture of these carriers.

The percentage yields stated in the examples signify percentage of theory and the temperatures are stated in degrees centigrade.

EXAMPLES OF PRODUCING THE COMPOUNDS OF FORMULA I

Example A.—Production of compounds I without isolation of intermediate compounds II A solution in chloroform of 1 mol of an amine of formula $R_2$—$NH_2$ and of 1 mol of triethylamine is added dropwise, preferably at $-10°$, to 1 mol of a compound of formula $R_1OP(O)Cl_2$ dissolved in chloroform. After the dropwise addition has been completed, the chloroform solution of the resulting, not isolated intermediate product of the formula

(II)

is added dropwise at $-10°$ to a chloroform suspension of 1 mol of dry sodium salt of p-nitrophenol. After stirring for a further 24 hours at room temperature, the chloroform solution is washed twice with water, twice with a 5% sodium bicarbonate solution and again twice with water. After drying and distilling off the chloroform, the required compounds are contained with a yield of about 50–90%; insofar as these are solid, they may be purified by recrystallizing from petroleum ether.

Using the above method the first 8 compounds listed in Table 2 below are obtained.

Example B.—(a) Production of the intermediate products of the formula

(II)

A solution of 1 mol of triethylamine and 1 mol of an amine $R_2$—$NH_2$ in diethyl ether or chloroform is added at $-5°$ to $0°$ to 1 mol of a compound $R_1O$—$P(O)Cl_2$ dissolved in diethyl ether or chloroform. After the reaction has been completed, the solution is briefly washed with ice water, dried and the solvent distilled off in a vacuum. As the intermediate products cannot be distilled, the residue resulting from the evaporation is used as such, without further purification, for the reaction with the 4-nitrophenolate, since this residue contains a compound of the formula

in a sufficiently pure form.

In the following Table 1 there are given the analysis figures and the yields of some of the intermediate products of Formula II.

TABLE 1

| Example | $R_1$ | $R_2$ | Chlorine content, percent | | Yield, percent | $n_D^{20°}$ |
|---|---|---|---|---|---|---|
| | | | Calc. | Found | | |
| 1(a) | $CH_3$ | iso-$C_3H_7$ | 20.7 | 21.6 | | |
| 2(a) | n-$C_3H_7$ | $CH_3$ | 20.7 | 20.9 | 62 | |
| 3(a) | n-$C_3H_7$ | $C_2H_5$ | 19.2 | 19.7 | 60 | |
| 4(a) | n-$C_3H_7$ | n-$C_3H_7$ | 17.8 | 18.2 | 69 | |
| 5(a) | n-$C_3H_7$ | iso-$C_3H_7$ | 17.8 | 17.3 | 78 | 1.4418 |
| 6(a) | iso-$C_3H_7$ | $CH_3$ | 20.7 | 21.3 | 93 | 1.4420 |
| 7(a) | iso-$C_3H_7$ | $C_2H_5$ | 19.2 | 20.0 | 92 | 1.4428 |
| 8(a) | iso-$C_3H_7$ | n-$C_3H_7$ | 17.8 | 18.4 | 80 | 1.4444 |
| 9(a) | iso-$C_3H_7$ | iso-$C_3H_7$ | 17.8 | 18.1 | 93 | 1.4432 |

(b) Reaction of the intermediate products with 4-nitrophenolate

One mol of dry sodium salt of 4-nitrophenolate is suspended in acetone and the corresponding chloride of the formula

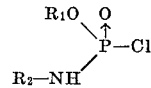

is added at $-5°$.

After stirring at room temperature for 5 to 10 hours, working up in the usual way is effected, yields of from 50 to 90% being obtained.

In the following Table 2 analysis figures are given for the products of Formula I

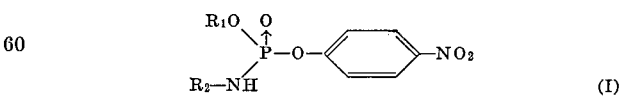

(I)

produced from the intermediate products mentioned in the preceding Table 1 and sodium 4-nitrophenolate, the first 8 compounds (I) being likewise produced by the method of Example A. The products of Formula I are obtained in an average yield of 80% (based on the intermediate products of Formula II). Those of the end products which are liquid were used without further purification and are characterized by their refractive index ($n_D^{20°}$). Those end products which are solid were recrystallised from chloroform/petroleum ether and are characterized by the melting point after recrystallization.

TABLE 2

| Example No. | $R_1$ | $R_2$ | N or P content, percent Calc. | N or P content, percent Found | M.P., °C. | $n_D^{20°}$ |
|---|---|---|---|---|---|---|
| 1(b) | $CH_3$ | $CH_3$ | P, 12.6 | 12.6 | 64 | |
| 2(b) | $CH_3$ | $C_2H_5$ | P, 11.9 | 11.8 | 42 | |
| 3(b) | $CH_3$ | $n-C_3H_7$ | P, 11.3 | 10.9 | | 1.5257 |
| 4(b) | $CH_3$ | $iso-C_3H_7$ | N, 10.2 | 10.0 | 61 | |
| | | | P, 11.3 | 11.1 | | |
| 5(b) | $C_2H_5$ | $CH_3$ | P, 11.9 | 11.6 | 80 | |
| 6(b) | $C_2H_5$ | $C_2H_5$ | P, 11.3 | 11.1 | 54 | |
| 7(b) | $C_2H_5$ | $n-C_3H_7$ | P, 10.8 | 11.0 | | 1.4977 |
| 8(b) | $C_2H_5$ | $iso-C_3H_7$ | N, 9.7 | 9.6 | | 1.5309 |
| | | | P, 10.8 | 10.7 | | |
| 9(b) | $n-C_3H_7$ | $CH_3$ | N, 10.2 | 9.8 | 44–46 | |
| 10(b) | $n-C_3H_7$ | $C_2H_5$ | N, 9.7 | 9.3 | | 1.5198 |
| 11(b) | $n-C_3H_7$ | $n-C_3H_7$ | N, 9.3 | 9.4 | | 1.5151 |
| 12(b) | $n-C_3H_7$ | $iso-C_3H_7$ | P, 10.3 | 10.1 | | 1.5128 |
| 13(b) | $iso-C_3H_7$ | $CH_3$ | N, 10.2 | 10.5 | 102 | |
| 14(b) | $iso-C_3H_7$ | $C_2H_5$ | P, 10.7 | 10.5 | 53–4 | |
| 15(b) | $iso-C_3H_7$ | $n-C_3H_7$ | P, 10.3 | 9.9 | 55–7 | |
| 16(b) | $iso-C_3H_7$ | $iso-C_3H_7$ | P, 10.3 | 10.1 | 46–8 | |

Yield in percent of theory based on p-nitrophenol
Examples:
| | |
|---|---|
| 1(b) | 85 |
| 2(b) | 56 |
| 3(b) | 63 |
| 4(b) | 84 |
| 5(b) | 67 |
| 6(b) | 81 |
| 7(b) | 50 |
| 8(b) | 82 |

The following examples illustrate the use of the compounds of Formula I.

EXAMPLE I 10 parts of the phosphoric acid derivative of Example 3 in Table 2 is mixed with 10 parts of a surface active alkylphenylpolyglycol ether and 80 parts of a xylene mixture; a clear solution results which is easily emulsifiable in water. An aqueous emulsion of this preparation containing 0.0125% of the phosphoric acid derivatives is sprayed on ivy branches covered with Carausius larvae 5 cm. long. After 5 days all larvae are dead.

EXAMPLE II

For the production of a powder which is easily suspendible in water, 25 parts of the phosphoric acid derivative of Example 4 in Table 2 are mixed with 3 parts of a surface active alkylphenylpolyglycol ether, 7 parts of a pulverulent silicic acid gel and 65 parts of kaolin. An aqueous suspension of this material containing 0.0125% of the phosphoric acid derivative is sprayed on Bruchidius imagines which are all dead after 2 days.

The remaining phosphoric acid derivatives mentioned in Table 2 may be used in manner similar to that described in Examples I and II.

The following Table 3 shows the toxicity of various known compounds and that of compounds of Formula I.

TABLE 3

| Compound | $LD_{50}$ oral, male rats, mg./kg. |
|---|---|
| $(CH_3O)_2\overset{O}{\underset{\uparrow}{P}}-O-\langle\rangle-NO_2$ methyl-paraoxon | 1 6 |
| $(C_2H_5O)_2\overset{O}{\underset{\uparrow}{P}}-O-\langle\rangle-NO_2$ paraoxon | 3 |
| $(CH_3O)_2\overset{S}{\underset{\uparrow}{P}}-O-\langle\rangle-NO_2$ methyl-parathion | 13 |
| $(C_2H_5O)_2\overset{S}{\underset{\uparrow}{P}}-O-\langle\rangle-NO_2$ parathion | 6.1 |
| Compound I; $R_1=C_2H_5$, $R_2=C_2H_5$ (Example 6(b), Table 2) | 18.0 |
| Compound I; $R_1=CH_3$, $R_2=CH_3$ (Example 1(b), Table 2) | 16.0 |
| Compound I; $R_1=CH_3$, $R_2=C_2H_5$ (Example 2(b), Table 2) | 19.3 |
| Compound I; $R_1=CH_3$, $R_2=n-C_3H_7$ (Example 3(b), Table 2) | 20.0 |
| Compound I; $R_1=CH_3$, $R_2=iso-C_3H_7$ (Example 4(b), Table 2) | 34 |

1 Estimated.

As may be seen from Table 3, the reduced toxicity which may be obtained by transition from paraoxon to parathion, can be achieved by replacing an ethoxy radical of paraoxon with the radical of a primary amine.

I claim:
1. The compound of the formula:

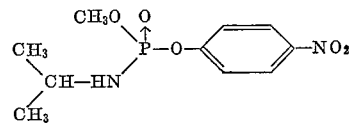

References Cited

UNITED STATES PATENTS 2,929,762  3/1960  Wasco et al. _____ 260—959 X
2,668,840  2/1954  Tolkmith _____ 260—954

FOREIGN PATENTS 814,152  9/1951  Germany.

OTHER REFERENCES

Neely et al., Biochemistry, vol. 3, No. 10, October 1964, pp. 1477 to 1482.

CHARLES B. PARKER, Primary Examiner

R. L. RAYMOND, Assistant Examiner

U.S. Cl. X.R.
260—973; 424—218